Figure 1:
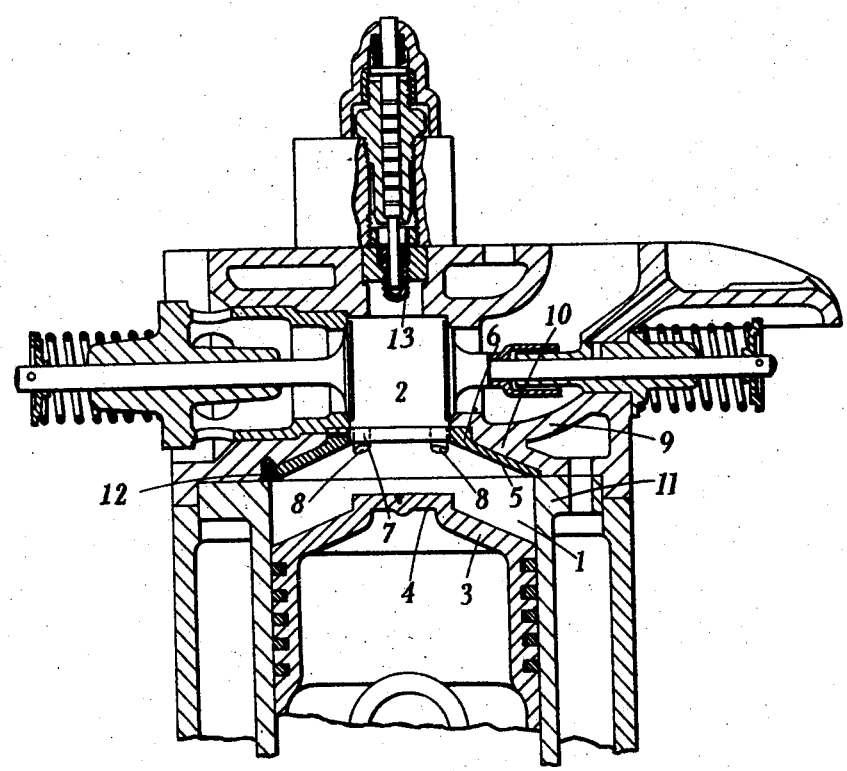

July 15, 1930.  F. CARTER ET AL  1,770,732

CYLINDER HEAD FOR INTERNAL COMBUSTION ENGINES

Filed May 13, 1929

INVENTORS
F. CARTER AND E. CARTER
BY
ATTORNEY

Patented July 15, 1930

1,770,732

UNITED STATES PATENT OFFICE

FRANK CARTER AND EVERSHED CARTER, OF STAMFORD, ENGLAND, ASSIGNORS OF ONE-THIRD TO GEORGE MILLS BLACKSTONE, OF STAMFORD, ENGLAND

CYLINDER HEAD FOR INTERNAL-COMBUSTION ENGINES

Application filed May 13, 1929, Serial No. 362,660, and in Great Britain October 26, 1928.

This invention relates to internal combustion engines of the compression ignition type i. e. in which solid fuel without any admixture of air is injected into the compressed air charge and fired by the heat of compression.

The invention has for its object the provision of means for retaining or avoiding excessive loss of the heat of compression and/or explosion, and further provides a means for constructing a chamber of preferred form in which all the limiting surfaces are readily machineable. This is especially necessary in the smaller sizes in order to maintain the determined volume.

It is a further object to provide in the cylinder head a separately formed roof-plate agreeing with the cylinder roof but not homogeneous therewith so as to serve as a heat retaining means as well as a means for enabling an accurate machining operation to be performed to determine the limiting shape of the roof surface.

The invention is primarily intended for use with engines of the kind in which the cylinder proper is surmounted by a combustion chamber or head the cross sectional area of which is less than that of the cylinder, into which chamber a projection or spigot on the piston is adapted to enter when the piston is in its upper position, but it is not exclusively limited to this kind.

In our English specification No. 249,586, we have described an engine in which the combustion chamber or head is of rectangular cross section, the solid fuel being normally injected in the said chamber, and in one modification we have described the said chamber as being provided with a bottom web having a central circular hole into which a projection or spigot on the piston is adapted to enter when the piston is in its upper position, the corners of the web between the said hole and the walls of the rectangular chamber being ported for the production of air currents with which to add to the turbulence within the rectangular chamber.

In this construction, the web which forms the central hole and carries the four ports is cast solid with the chamber itself and thus is in more or less direct contact with the cooling water, thus extracting heat from the air as it passes through during the final stages of compression; whereas in the present invention we provide a separately-formed ported plate which not being integral with the casting, instead of acting as a cooler will rather tend to heat the new charge with heat retained from the previous combustion.

According to the present invention, we provide in an engine of the compression-ignition type a plate preferably of heat-resisting material to form the effective roof of the cylinder proper and held in position by the cylinder construction. In the preferred form the plate is shaped to extend to form a floor to the combustion chamber which is preferably rectangular in cross section, the overhang of the plate within the walls of said chamber being cut away to leave a central hole, into which a circular projection or spigot on the top of the piston is adapted to enter, the plate being ported for production of air currents externally of said hole, but within the four corners of the rectangular chamber. We do not confine ourselves to the arrangement of four holes to give turbulence as these may be varied in number and alternatively we may omit these holes and leave sufficient clearance between the spigot and central hole in the roof plate for the purpose.

It is to be understood that by the term "heat resisting material", we mean for example, a steel not subject to excessive erosion or deterioration under the temperature produced. In the preferred form, the plate is conical to agree with a conically shaped cylinder roof and piston top, and has a central squared upper shoulder to seat in similarly-shaped recesses in the chamber castings and being large enough in its major diameter to rest on the cylinder wall to retain it in position.

Figure 2:
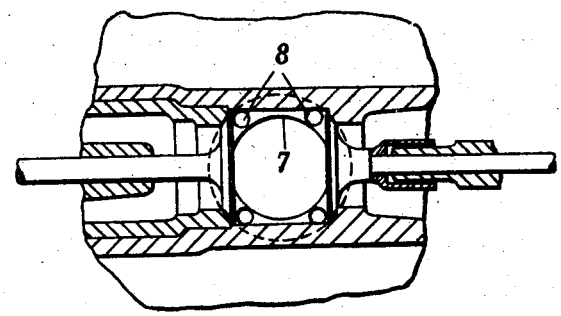

One form of the invention is illustrated in the accompanying drawings, in which, Fig. 1 illustrates a vertical section, and
Fig. 2 a horizontal section of a part.

Turning now to the form illustrated, the cylinder proper 1 is surmounted by a combustion chamber 2 which, in the form shown, is of rectangular cross-section, the inlet and outlet valve ports being arranged in its opposite walls. The piston 3 carries a circular projection or spigot 4 which is adapted to penetrate into the bottom of the chamber 2.

According to the invention, the roof of the cylinder 1 is provided with a roof plate 5 having the form of a truncated cone, and provided with a central boss or flange 6 having a circular bore 7 adapted to receive the spigot 4.

Within the overhang of the flange 6 which remains within the area included by the walls of the chamber 2, the roof plate is provided with holes 8 for the passage of turbulent currents of air from the cylinder into the chamber 2 as the piston rises to its upper position. The roof plate 5 is formed of heat-resisting material as set forth, and remains substantially hotter during the operation of the engine than the normal roof of a cylinder which is comprised by a face of a casting serving to house part of the cooling water.

In the form shown, the upper casting 9 of the cylinder head is recessed at 10 to receive the roof-plate which rests on the edge of the lower casting 11 comprising the cylinder wall, the roof-plate being further held from movement by a grub screw 12.

The construction described offers further advantages with regard to small sizes of engine in that the chamber walls and the roof-plate can be carefully and accurately machined so as to finally determine the designed volume of the compression space.

The solid fuel is injected from the nozzle 13 into the chamber 2 in known manner.

We claim:—

1. In an internal combustion engine of the compression ignition type, a cylinder, a combustion chamber rectangular in plan in the roof of said cylinder, an air inlet valve opening into said combustion chamber, an exhaust valve opening into said combustion chamber, the roof of said cylinder being faced with a separately-formed roof-plate agreeing with the shape of said cylinder roof and having a central circular bore beneath said chamber, the overhang of said plate between said central bore and the walls of said chamber being holed for the passage of turbulent currents therethrough.

2. A roof-plate for the cylinder of an internal combustion engine comprising an independent heat-resisting plate of truncated conical section, having a central bore, and holes through said plate externally of said bore, means being provided for retaining said plate in the roof of a cylinder.

3. In an internal combustion engine, a piston having a circular projection, a cylinder wall, a casting providing a cylinder roof, said roof being surmounted by a combustion chamber, an air inlet valve opening into said combustion chamber, an air exhaust valve opening into said combustion chamber, the surface defining the roof extending outwardly of the cylinder wall, and a roof-plate agreeing and contacting with the shape of said roof resting on the top of said cylinder wall and terminating below said combustion chamber, the apex of said roof plate having a bore positioned below said combustion chamber to receive said projection, and leaving apertures for passage of air from under said roof-plate into said combustion chamber.

4. A roof-plate for an internal combustion engine comprising a plate of truncated conical section having outer and inner conical walls and an upper central bore, the central bore being surrounded by an upper collar and having further apertures leading from the internal conical wall to the upper surface of the collar.

5. In an internal combustion engine of the compression ignition type, a cylinder, a piston having a projection, a combustion chamber rectangular in plan in the roof of said cylinder, an air inlet valve opening into said combustion chamber, an air exhaust valve opening into said combustion chamber, the roof of said cylinder being faced with a separately formed roof-plate agreeing with the shape of said cylinder roof and having a central circular bore beneath said combustion chamber, adapted to receive the projection on the piston, the overhang of said plate, between said central bore and the walls of said chamber, being holed for the passage of turbulent currents therethrough.

In testimony whereof we affix our signatures.

FRANK CARTER.
EVERSHED CARTER.